(12) United States Patent
Chishima

(10) Patent No.: US 8,947,248 B2
(45) Date of Patent: Feb. 3, 2015

(54) INPUT APPARATUS

(75) Inventor: Makoto Chishima, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/817,793

(22) PCT Filed: Aug. 11, 2011

(86) PCT No.: PCT/JP2011/004563
§ 371 (c)(1),
(2), (4) Date: Feb. 19, 2013

(87) PCT Pub. No.: WO2012/023273
PCT Pub. Date: Feb. 23, 2012

(65) Prior Publication Data
US 2013/0154842 A1 Jun. 20, 2013

(30) Foreign Application Priority Data

Aug. 19, 2010 (JP) ................. 2010-183955

(51) Int. Cl.
G08B 21/00 (2006.01)
G08B 21/18 (2006.01)
G06F 3/041 (2006.01)
G06F 3/0489 (2013.01)
G06F 3/0488 (2013.01)

(52) U.S. Cl.
CPC ............ G08B 21/182 (2013.01); G06F 3/0416 (2013.01); G06F 3/04895 (2013.01); G06F 3/0488 (2013.01); G06F 2203/04105 (2013.01)
USPC ...... 340/655; 340/407.2; 340/12.22; 345/173; 345/174; 345/175; 345/177

(58) Field of Classification Search
CPC ................ G06F 3/033; G06F 3/0414
USPC ............ 340/655, 407.2, 12.22; 345/173, 174, 345/175, 177
See application file for complete search history.

(56) References Cited

U.S. PATENT DOCUMENTS

| 7,825,911 | B2 * | 11/2010 | Sano et al. | 345/173 |
| 8,106,787 | B2 * | 1/2012 | Nurmi | 340/665 |
| 2006/0284858 | A1 * | 12/2006 | Rekimoto | 345/173 |

FOREIGN PATENT DOCUMENTS

| JP | 2009-099058 A | 5/2009 |
| JP | 2010-128769 A | 6/2010 |
| JP | 2010-140102 A | 6/2010 |

OTHER PUBLICATIONS

International Search Report; PCT/JP2011/004563; Oct. 11, 2011.

* cited by examiner

*Primary Examiner* — Tai T Nguyen

(74) *Attorney, Agent, or Firm* — Studebaker & Brackett PC

(57) ABSTRACT

Damaging a touch sensor is prevented by an input apparatus including a pressing load detection unit 102 for detecting a pressing load applied by a pressing object pressing a touch sensor, a contact area detection unit 103 for detecting a contact area of the object on the sensor, a memory unit 105 for storing a pressing load threshold for receiving an input and a damage threshold higher than the pressing load threshold and varies according to the contact area, a control unit 104 for obtaining the pressing load threshold and the damage threshold corresponding to the contact area from the memory unit, and receiving the input when the pressing load reaches the pressing load threshold, or generating a warning signal when the pressing load reaches the damage threshold, and a notification unit 106 for receiving the warning signal from the control unit and outputting a warning.

5 Claims, 9 Drawing Sheets

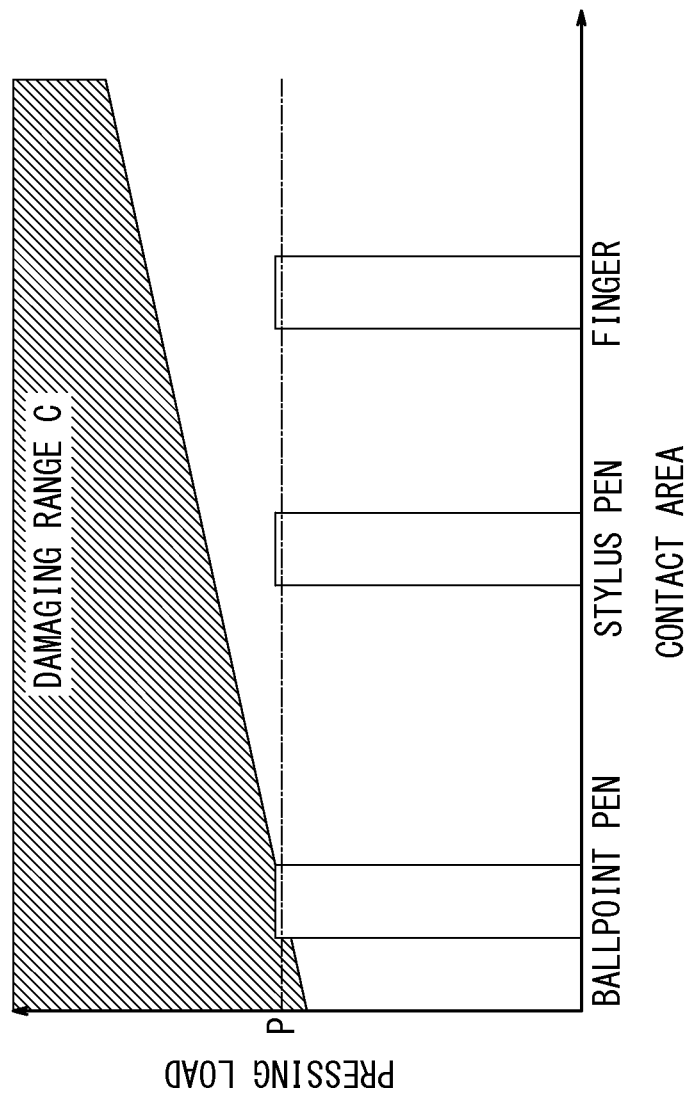

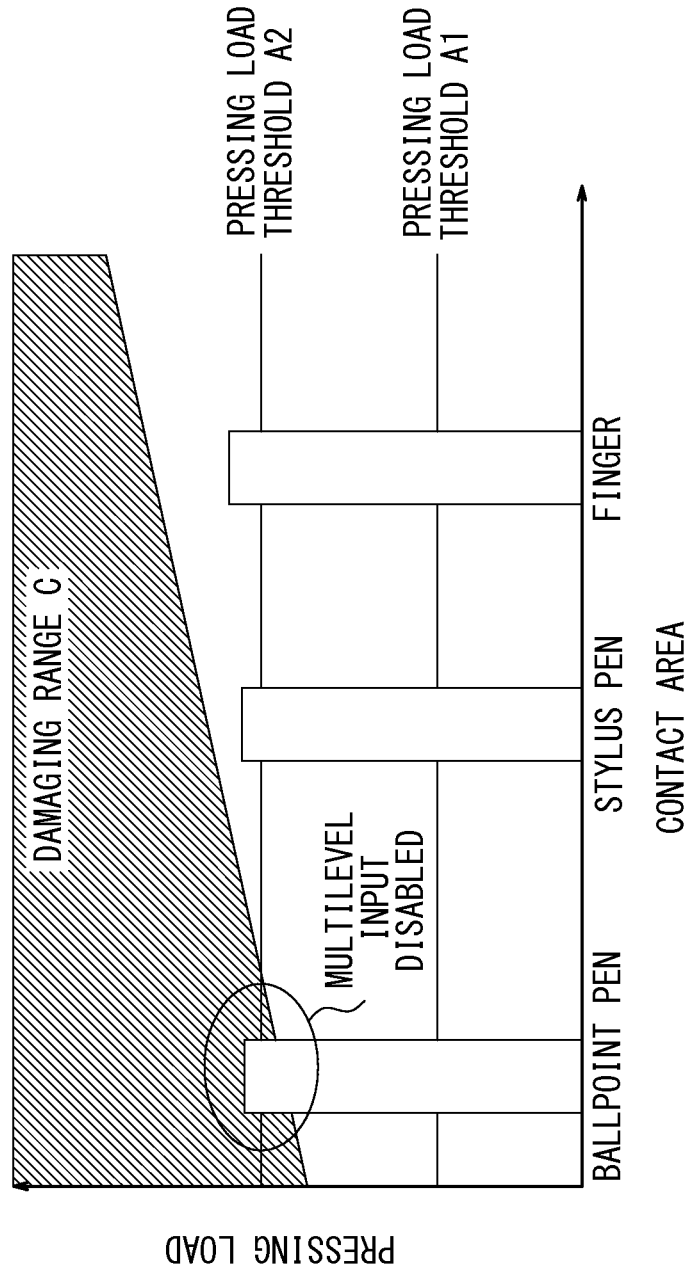

INPUT APPARATUS

CROSS REFERENCE TO RELATED APPLICATION

This application claims priority to and the benefit of Japanese Patent Application No. 2010-183955 filed on Aug. 19, 2010, the entire contents of which are incorporated herein by reference.

TECHNICAL FIELD

The present invention relates to an input apparatus having a touch sensor.

BACKGROUND

As input apparatuses such as operation units, switches and the like for receiving input operations by users, input apparatuses having touch sensors such as touch panels and touch switches have been widely used for mobile terminals such as mobile phones; information equipments such as calculators and ticket vending machines; home electric appliances such as microwaves, TV sets, lighting equipments; industrial equipments (FA equipment) and the like.

Recently, there has been suggested an input apparatus that sets a plurality of thresholds of a pressing load on the touch sensor and, when the user presses the touch sensor applying different pressing loads, detects different pressing loads and performs different operations (for example, see Patent Document 1). In the following, an operation to press at one level and then to press further at the same pressing position is referred to as two-level pressing, and operations to press at multilevel including the two-level pressing are referred to as multiple pressing.

Such an input operation to the touch sensor may be performed by a finger or an input operation tool. Although the input operation tool is generally assumed to be a stylus pen accompanying the touch sensor, an unexpected tool such as a ballpoint pen also may perform the input operation.

RELATED DOCUMENT

Patent Document 1: Japanese Patent Laid-Open No. 2010-140102

SUMMARY

The pressing load (pressure) in a unit area of the touch sensor varies based on a contact area on the touch sensor and the pressing load. With the same pressing load, the pressure is larger as the contact area on the touch sensor is smaller.

FIG. 8 is a diagram illustrating a damaging range of a conventional touch sensor due to the pressing load. A horizontal axis represents the contact area, and a vertical axis represents the pressing load. A damaging range C is a pressing load range where the touch sensor is damaged due to an excessive pressing load applied thereon. Here, the damage includes general failures such as crack of the touch sensor, separation of a joint part of the touch sensor and breakage due to the excessive pressure. When the touch sensor is pressed by the finger, since the contact area is large and thus the pressing load is distributed and the pressure reduces, a pressing load value to reach the damaging range C is high. On the other hand, when the touch sensor is pressed by a tip of the ballpoint pen and the like, the pressing load is focused on one spot and thus the pressing load value to reach the damaging range C is low. That is, when a pressing load P is applied on the touch sensor by the finger or the stylus pen (in a certain size) accompanying the touch sensor, the pressure load P does not reach the damaging range C. On the other hand, when the pressure load P is applied on the touch sensor by a pointed item such as the ballpoint pen, the pressure load P reaches the damaging range C and the touch sensor is damaged.

Especially in multilevel pressing, since an excessive pressure in comparison to one-level pressing may be applied, when an unexpected tool having a small contact area is used to press the touch sensor, the touch sensor is more likely to be damaged. As illustrated in FIG. 9, when a first level pressing load threshold A1 and a second level pressing load threshold A2 are set assuming that the finger or the stylus pen is used and the multilevel pressing is performed by using the unexpected tool having a small contact area such as the ballpoint pen, the second level pressing load threshold A2 reaches the damaging range C. Accordingly, a multilevel input may not be performed by using the unexpected tool having a small contact area.

In order to solve the above problem, the present invention is to provide an input apparatus capable of preventing from damaging the touch sensor.

In order to solve the above problem, an input apparatus having a touch sensor according to the present invention includes: a pressing load detection unit configured to detect a pressing load applied by a pressing object pressing the touch sensor; a contact area detection unit configured to detect a contact area by the pressing object on the touch sensor; a memory unit configured to store a pressing load threshold for receiving an input and a damage threshold higher than the pressing load threshold and varies according to the contact area; a control unit configured to obtain the pressing load threshold and the damage threshold corresponding to the contact area detected by the contact area detection unit from the memory unit, and to receive the input when the pressing load detected by the contact area detection unit reaches the pressing load threshold, or to generate a warning signal when the pressing load detected by the contact area detection unit reaches the damage threshold; and a notification unit configured to receive the warning signal from the control unit and to output a warning.

Also, according to the input apparatus, the memory unit stores pressing load thresholds of a plurality of levels, and the control unit obtains the pressing load thresholds of the plurality of levels from the memory unit and, when the pressing load detected by the contact area detection unit reaches the pressing load threshold of each of the levels, receives an input of each of the levels.

Also, according to the input apparatus, the pressing load threshold is set to increase in proportion to the contact area.

Further, according to the input apparatus, at least a pressing load threshold of a level where the pressing load is maximum among the pressing load thresholds of the plurality of levels is set to increase in proportion to the contact area.

The control unit includes a unit to obtain the pressing load threshold from the memory unit and, when the pressing load detected by the contact area detection unit reaches the pressing load threshold, to generate an input reception notification signal, and the notification unit receives the input reception notification signal from the control unit and notifies that the input is received.

According to the present invention, when a pointed tool such as a ballpoint pen is used, a warning is issued to the user. Thereby, damaging the touch sensor may be prevented.

BRIEF DESCRIPTION OF DRAWINGS

FIG. 8 is a diagram illustrating damage of the touch sensor by a pressing load; and FIG. 9 is a diagram illustrating damage of the touch sensor by a pressing load of multilevel pressing.

DESCRIPTION OF EMBODIMENTS

Embodiments of the present invention will be described with reference to the accompanying drawings.

First Embodiment

Figure 1:
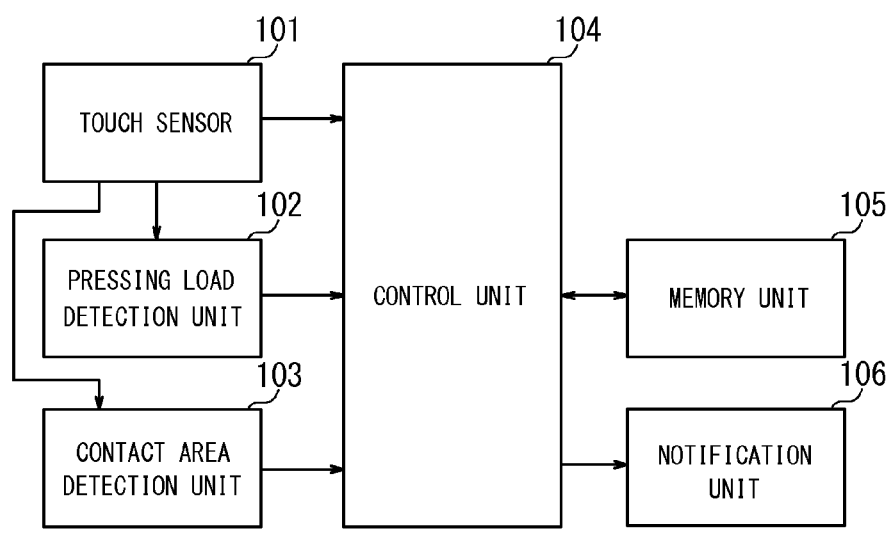
FIG. 1 is a block diagram illustrating a schematic configuration of an input apparatus according to embodiments of the present invention.

FIG. 1 is a block diagram illustrating a schematic configuration of an input apparatus according to a first embodiment. The input apparatus according to the present embodiment includes a touch sensor 101, a pressing load detection unit 102, a contact area detection unit 103, a control unit 104, a memory unit 105 and a notification unit 106. Although the control unit 104 and the memory unit 105 are illustrated as separated blocks, it is needless to say that the control unit 104 may include the memory unit 105.

The touch sensor 101 receives pressing by a pressing object such as a finger or an input operation tool and outputs position information to the control unit 104. The touch sensor 101 may be of a known type such as, for example, a resistance film type, a capacitance type or the like.

When the touch sensor 101 is pressed by the pressing object, the pressing load detection unit 102 detects a pressing load and outputs the pressing load to the control unit 104. The pressing load detection unit 102 is constituted by using an element such as a piezoelectric element or the like that linearly reacts to a load.

When the touch sensor 101 is pressed by the pressing object, the contact area detection unit 103 detects a contact area of the pressing object on the touch sensor 101 and outputs the contact area to the control unit 104. For example, when the touch sensor 101 is of the resistance film type and constituted by using an electrode plane extended on a matrix, the contact area detection unit 103 detects the contact area based on a change degree of a voltage.

The memory unit 105 stores a pressing load threshold and a damaging range threshold higher than the pressing load threshold and corresponds to the contact area. Here, the pressing load threshold is a threshold of a pressing load value the touch sensor 101 receives from an input by a user. The damaging range is a threshold calculated by subtracting a certain margin from the pressing load value reaching the damaging range of the touch sensor 101.

The control unit 104 obtains the pressing load threshold from the memory unit 105 and, when the pressing load detected by the pressing load detection unit 102 reaches the pressing load threshold, generates an input reception notification signal and outputs the input reception notification signal to the notification unit 106. Note that, in this specification, "when the pressing load reaches the threshold" includes "when the pressing load exceeds the threshold".

Also, the control unit 104, from the memory unit 105, obtains the damage threshold varying according to the contact area detected by the contact area detection unit 103. Then, when the pressing load detected by the pressing load detection unit 102 reaches the damage threshold, the control unit 104 generates a warning signal and outputs the warning signal to the control unit 106.

The notification unit 106, according to the input reception notification signal received from the control unit 104, notifies the user that the input is received. Notification of the reception of the input is made by, for example, generating a click sound or, when the touch sensor 101 has a tactile sensation providing unit, by vibrating the touch sensor 101 such that a tactile sensation such as a click sensation is provided.

The notification unit 106 issues a warning to the user according to the warning signal received from the control unit 104. The warning is issued by, for example, sounding an alarm, flashing a back light when the touch sensor 101 has a liquid crystal panel, flashing an LED when the touch sensor 101 has an alarm LED, or displaying a warning message when the touch sensor 101 has a display unit.

Figure 2:
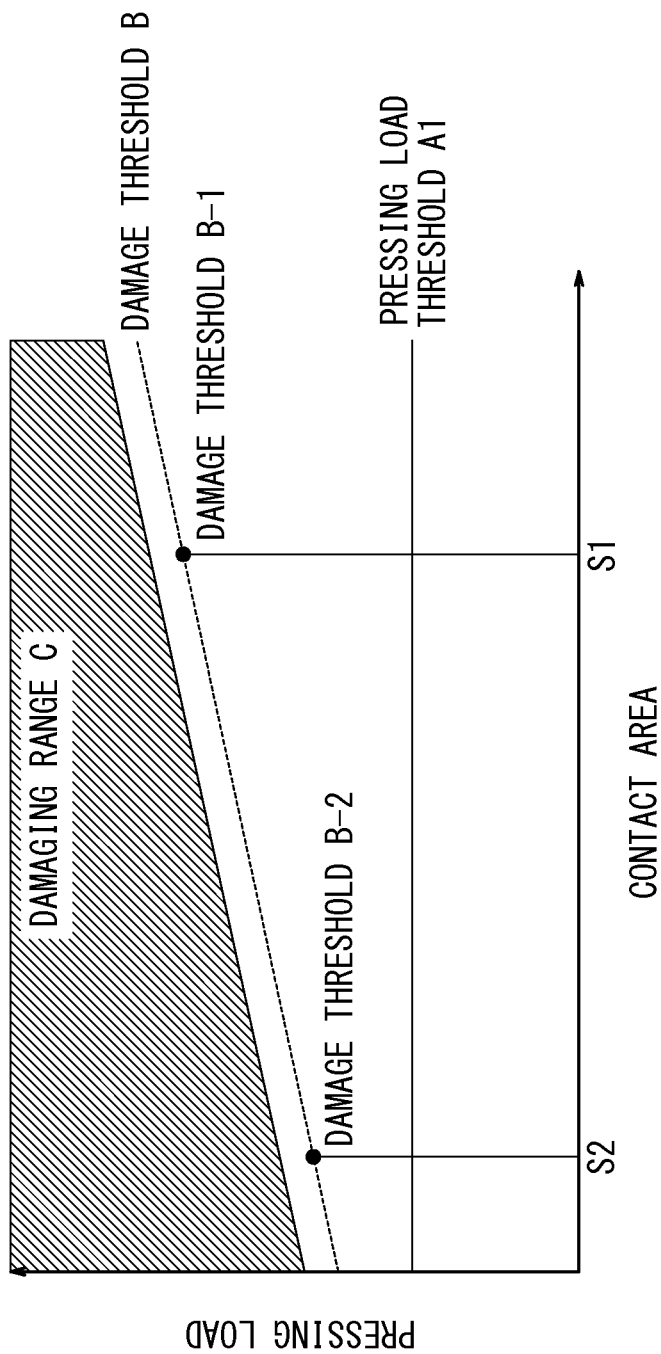
FIG. 2 is a diagram illustrating a pressing load threshold and damage thresholds of the input apparatus according to a first embodiment of the present invention.

FIG. 2 is a diagram illustrating a pressing load threshold A1, a damage threshold B and a damaging range C of the input apparatus according to the present embodiment. According to the first embodiment, the input apparatus is assumed to handle one-level pressing alone, which is a usual pressing operation, and to set one pressing load threshold as illustrated in FIG. 2.

Figure 3:
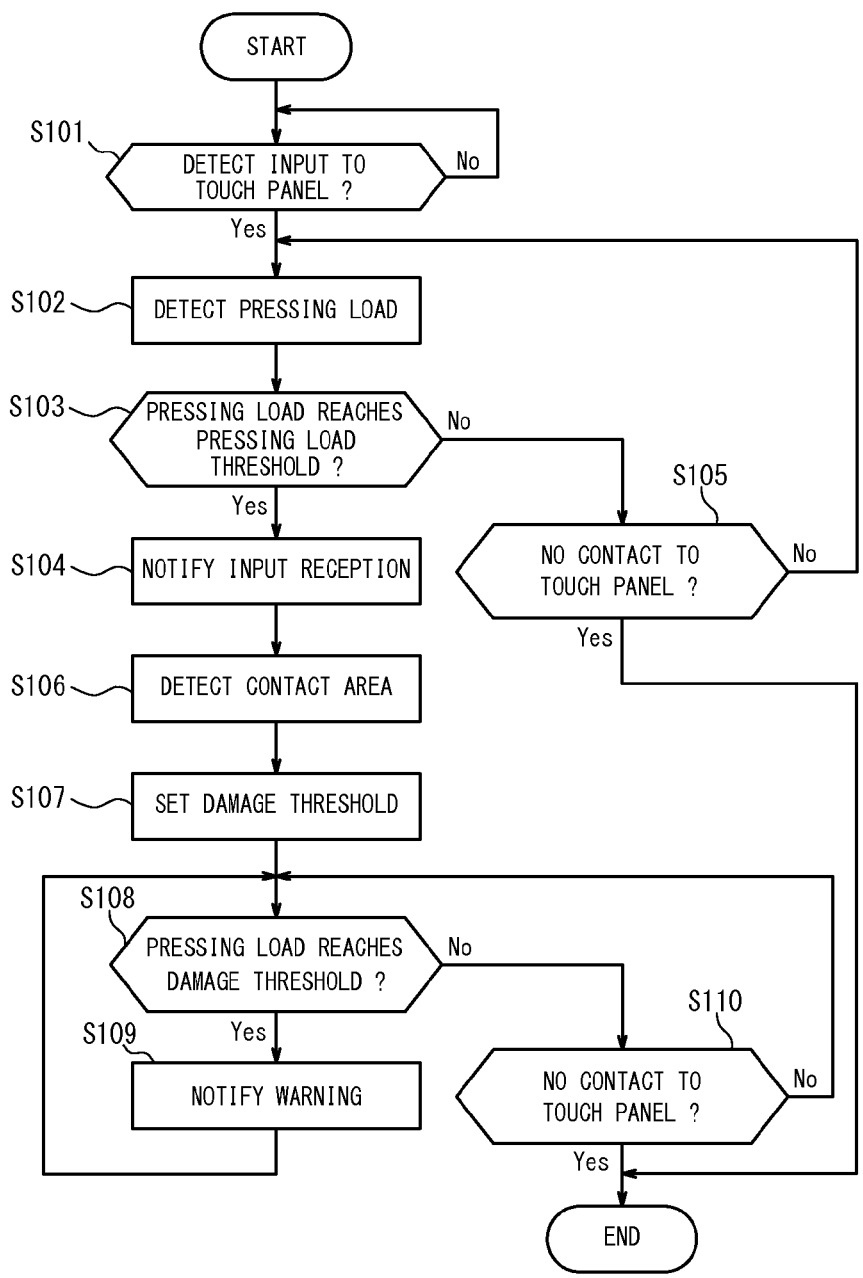
FIG. 3 is a flowchart illustrating an operation of the input apparatus according to the first embodiment of the present invention.

FIG. 3 is a flowchart illustrating an operation of the input apparatus according to the first embodiment. First, the touch sensor 101 detects whether there is an input (step S101). When there is an input by the user, the pressing load detection unit 102 detects the pressing load (step S102). Then, the control unit 104 determines whether the pressing load of the input reaches the pressing load threshold A1 obtained from the memory unit 105 (step S103).

When it is determined at step S103 that the pressing load does not reach the pressing load threshold A1, the pressing load detection unit 102 monitors a change in the pressing load (step S105) and, when the contact is released, that is, when the pressing load becomes 0, the input apparatus determines that the input to the touch sensor 101 by the user is canceled and ends the operation.

On the other hand, when it is determined at step S103 that the pressing load reaches the pressing load threshold A1, the notification unit 106 notifies the user that the input is received (step S104).

Subsequently, the contact area detection unit 103 detects the contact area of the pressing object on the touch sensor 101 (step S106). Then, the control unit 104, by referring to the memory unit 105, obtains a damage threshold B-α corresponding to the detected contact area and sets the damage threshold B-α as the damage threshold (step S107). As illustrated in FIG. 2, for example, a damage threshold B-1 is set when a large contact area S1 by the finger or the like is detected, and a damage threshold B-2 is set when a small contact area S2 by a ballpoint pen or the like is detected.

Next, the control unit 104 determines whether the pressing load detected at step 102 reaches the damage threshold B-α set at step S107 (step S108). When determining that the pressing load reaches the damage threshold B-α, the input apparatus warns the user, by the notification unit 106, in a manner different from notification at step S104, that an excessive load is applied (step S109). On the other hand, when it is determined that the pressing load does not reach the damage threshold B-α, the input apparatus monitors a change in the pressing load by the pressing load detection unit 102 (step S110). When the contact to the touch sensor 101 by the user is released, that is, when the pressure load becomes 0, the input apparatus determines that the input to the touch sensor 101 by the user is finished and ends the operation.

According to the input apparatus of the first embodiment, as described above, when a pointed tool such as the ballpoint pen is used, the user is warned and thus damaging the touch sensor may be prevented.

Second Embodiment

Next, an input apparatus according to a second embodiment will be described. A schematic configuration of the input apparatus according to the second embodiment is similar to that of the input apparatus according to the first embodiment illustrated in FIG. 1. Unlike the input apparatus according to the first embodiment, however, the input apparatus according to the second embodiment handles multilevel pressing. Descriptions of the input apparatus according to the second embodiment similar to that of the input apparatus according to the first embodiment will be omitted appropriately.

When the multilevel pressing is performed to the touch sensor 101, a display such as a menu panel is changed in various manners according to the level of the pressing.

The memory unit 105 stores the damage thresholds and pressing load thresholds of a plurality of levels corresponding to the multilevel pressing.

The control unit 104 retrieves the pressing load thresholds of the plurality of levels from the memory unit 105 and, when the pressing load detected by the pressing load detection unit 102 reaches the pressing load threshold of each of the levels, generates the input reception notification signal of each of the levels and outputs the notification signal to the notification unit 106. The notification unit 106, according to the notification signal of each of the levels received from the control unit 104, notifies that the input is received. A method of such notification may be either the same or different between the levels.

Figure 4:
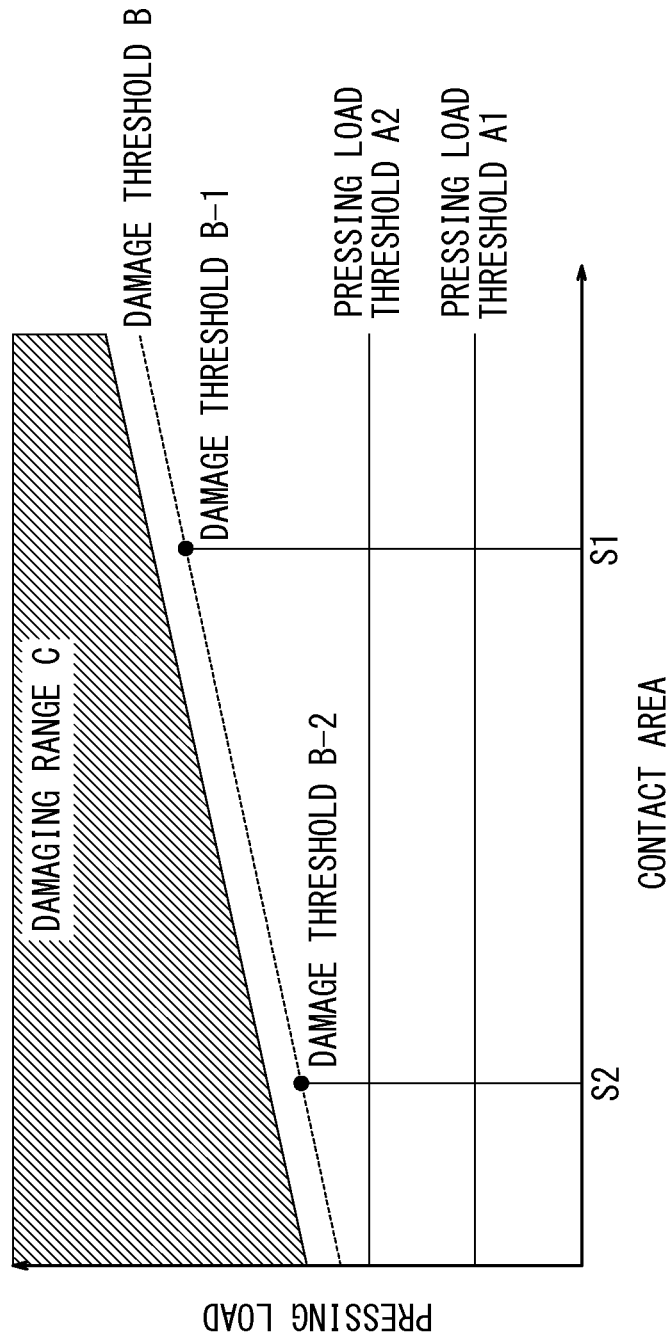
FIG. 4 is a diagram illustrating pressing load thresholds and damage thresholds of an input apparatus according to a second embodiment of the present invention.

FIG. 4 is a diagram illustrating a first level pressing load threshold A1, a second level pressing load threshold A2, the damage threshold B and the damaging range C of the input apparatus according to the second embodiment. According to the present embodiment, the input apparatus handles the multilevel pressing, and the pressing load thresholds of those levels are at a fixed value regardless of the contact area. In the following description, two-level pressing is described as an example.

Figure 5:
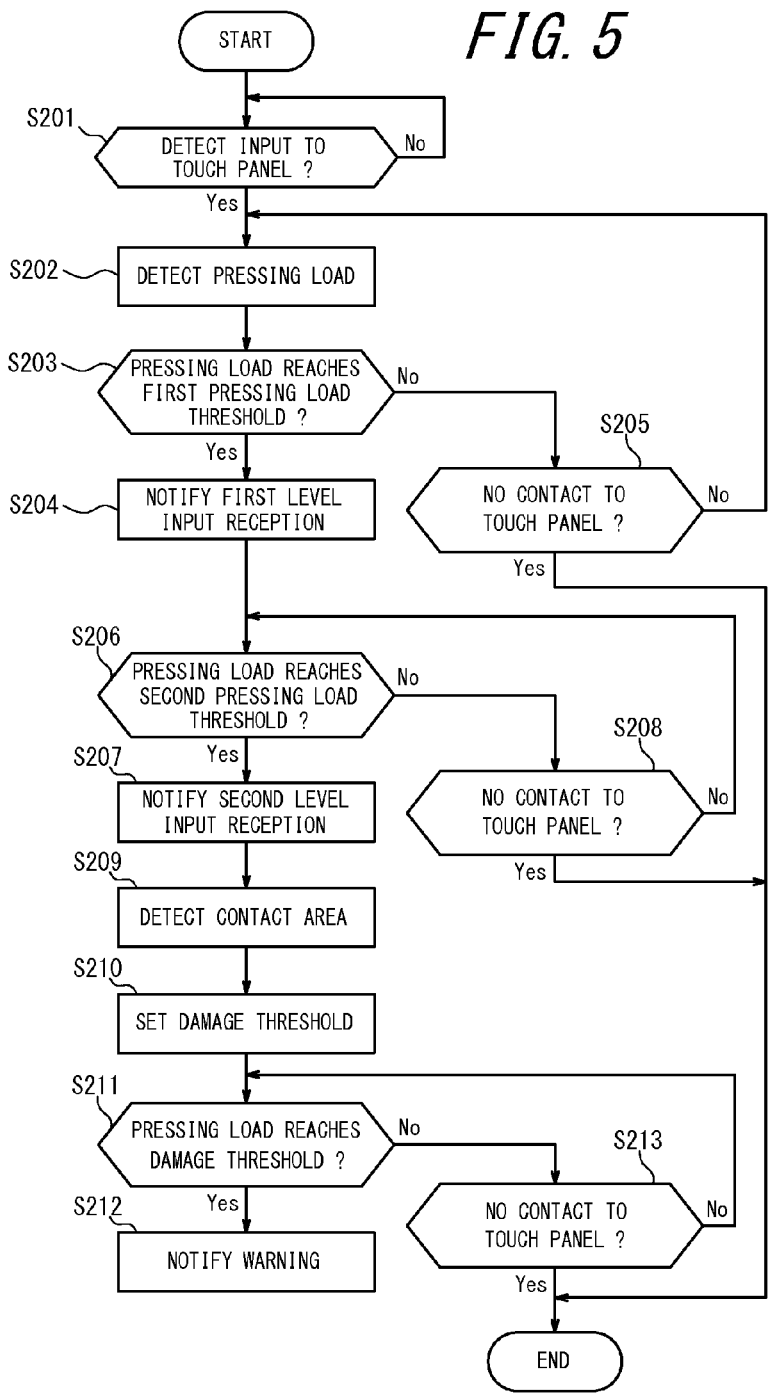
FIG. 5 is a flowchart illustrating an operation of the input apparatus according to the second embodiment of the present invention.

FIG. 5 is a flowchart illustrating an operation of the input apparatus according to the second embodiment. First, the touch sensor 101 detects whether there is an input (step S201). When there is an input by the user, the pressing load detection unit 102 detects the pressing load (step S202). Then, the control unit 104 determines whether the pressing load of the input reaches the first pressing load threshold A1 obtained from the memory unit 105 (step S203).

When it is determined at step S203 that the pressing load does not reach the pressing load threshold A1, the input apparatus monitors a change in the pressing load by the pressing load detection unit 102 (step S205). When the contact is released, that is, when the pressing load becomes 0, the input apparatus determines that the input to the touch sensor 101 by the user is canceled and ends the operation.

On the other hand, when it is determined at step S203 that the pressing load reaches the pressing load threshold A1, the notification unit 106 notifies the user that a first level input is received (step S204).

Further, the control unit 104 determines whether the pressing load detected at step S202 reaches the second pressing load threshold A2 obtained from the memory unit 105 (step S206). When it is determined that the pressing load does not reach the second pressing load threshold A2, the input apparatus monitors a change in the pressing load (step S208). When the contact is released, that is, when the pressing load becomes 0, the input apparatus determines that the input to the touch sensor 101 by the user is finished and ends the operation.

On the other hand, when it is determined at step S206 that the pressing load reaches the second pressing load threshold A2, the input apparatus notifies the user by the notification unit 106 that a second level input is received (step S207).

Subsequently, the contact area detection unit 103 detects the contact area on the touch sensor 101 by the finger or the input operation tool (step S209). Then, the input apparatus, sets the damage threshold B-α corresponding to the detected contact area as the damage threshold, by the control unit 104 referring to the memory unit 105 (step S210). As illustrated in FIG. 3, for example, the input apparatus sets the damage threshold B-1 when the large contact area S1 by the finger or the like is detected, and sets the damage threshold B-2 when the small contact area S2 by the ballpoint pen or the like is detected.

Next, the control unit 104 determines whether the pressing load detected at step S202 reaches the damage threshold B-α set at step S210 (step S211). When it is determined that the pressing load reaches the damage threshold B-α, the input apparatus warns the user that an excessive load is applied by the notification unit 106, in a manner different from the notification at steps S204 and S207 (step S212). On the other hand, when it is determined that the pressing load does not reach the damage threshold B-α, the input apparatus monitors a change in the pressing load by the pressing load detection unit 102 (step S213). When the contact to the touch sensor 101 by the user is released, that is, when the pressing load becomes 0, the input apparatus determines that the input to the touch sensor 101 by the user is finished and ends the operation.

For three or more pressing levels, the input apparatus sets a threshold An (n represents the number of pressing levels) to be equal to or smaller than the threshold B and, after repeating operations at steps S206-S208 as many times as needed, performs operations at and after step S209.

According to the input apparatus of the second embodiment, as described above, when the multilevel pressing is performed, damaging the touch sensor may be prevented.

Third Embodiment

Next, an input apparatus according to a third embodiment will be described. The input apparatus according to the third embodiment, similarly to that of the second embodiment, handles the multilevel pressing. Unlike the input apparatus according to the second embodiment, however, the input apparatus according to the third embodiment sets the pressing load threshold to increase in proportion to the contact area. Descriptions of the input apparatus according to the third embodiment similar to that of the input apparatus according to the second embodiment will be omitted appropriately. In the following description, the two-level pressing is described as an example.

Figure 6:
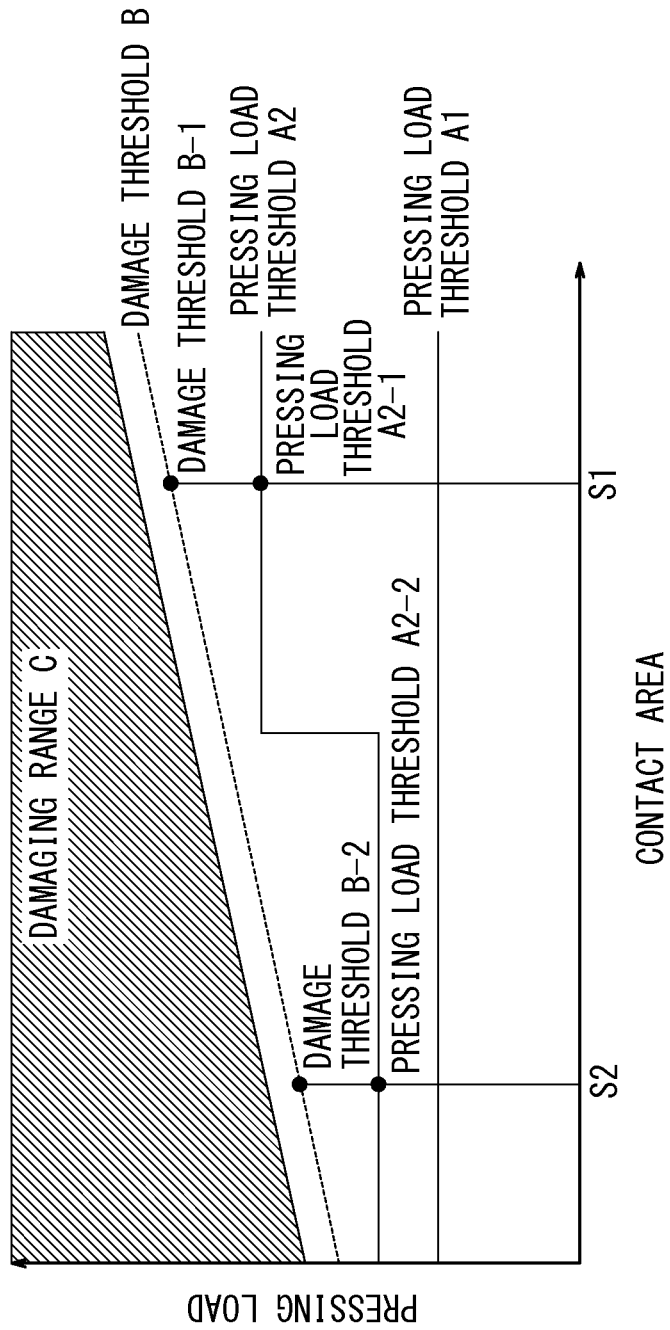
FIG. 6 is a diagram illustrating pressing load thresholds and damage thresholds of an input apparatus according to a third embodiment of the present invention.

FIG. 6 is a diagram illustrating the two level pressing load thresholds A1 and A2, the damage threshold B and the damaging range C of the input apparatus according to the present embodiment. Here, the pressing load threshold increases in stages in proportion to the contact area as an example, however, a change of the pressing load threshold corresponding to the contact area is not limited to a staged manner but may be, for example, in a manner following a straight line tilted at a certain angle. Also, the pressing load threshold A1, in the same manner as the pressing load threshold A2, may be set to vary according to the contact area.

Figure 7:
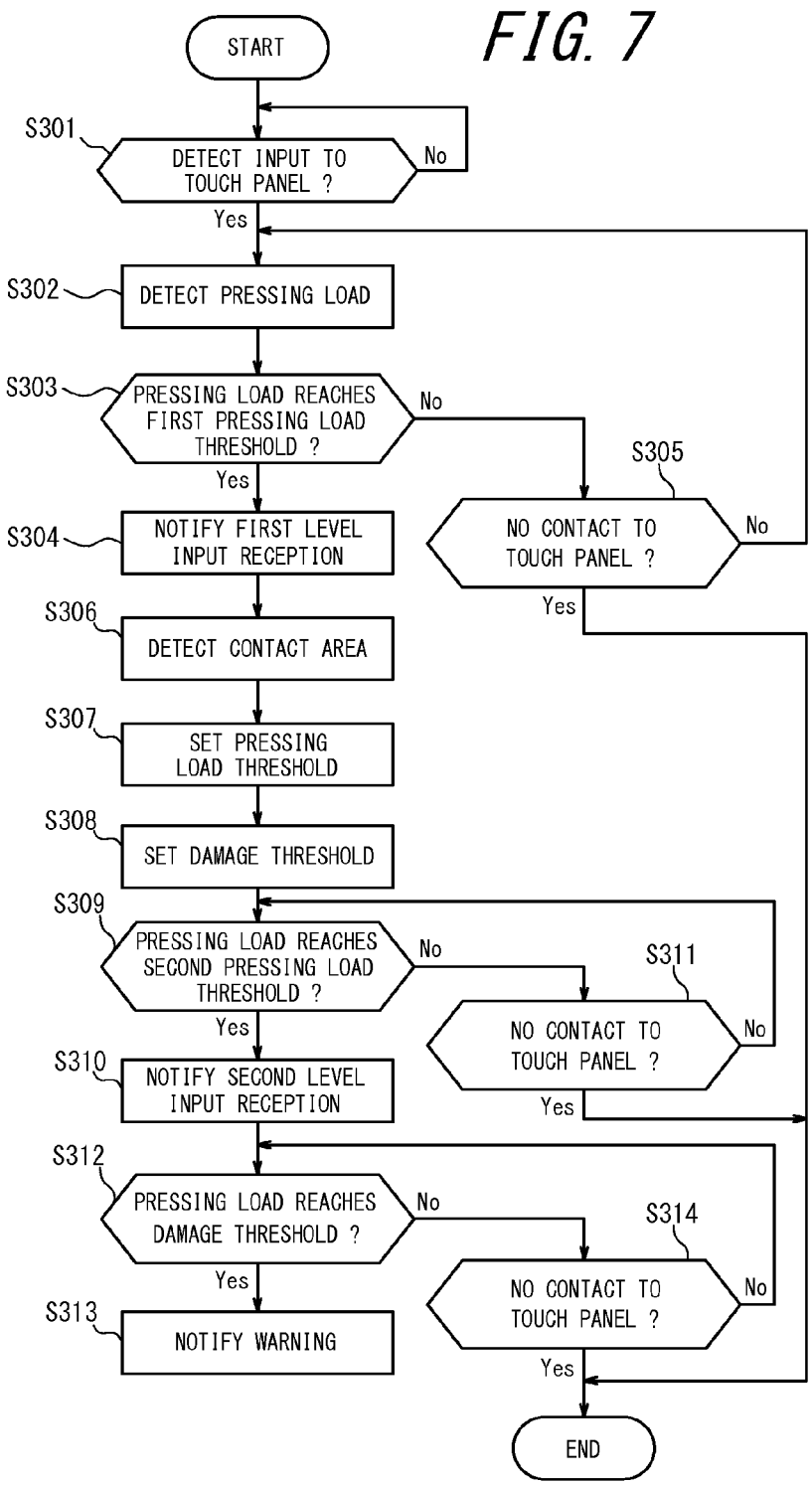
FIG. 7 is a flowchart illustrating an operation of the input apparatus according to the third embodiment of the present invention.

FIG. 7 is a flowchart illustrating an operation of the input apparatus according to the third embodiment. First, the touch sensor 101 detects whether there is an input (step S301). When there is an input by the user, the pressing load detection unit 102 detects the pressing load (step S302). Then, the input apparatus determines by the control unit 104 whether the pressing load of the input reaches the first pressing load threshold A1 obtained from the memory unit 105 (step S303).

When it is determined at step S303 that the pressing load does not reach the pressing load threshold A1, the input apparatus monitors a change in the pressing load by the pressing load detection unit 102 (step S305). When the contact is released, that is, when the pressing load becomes 0, the input apparatus determines that the input to the touch sensor 101 by the user is canceled and ends the operation.

On the other hand, when it is determined at step S303 that the pressing load reaches the pressing load threshold A1, the input apparatus notifies the user by the notification unit 106 that the first level input is received (step S304).

Subsequently, the input apparatus detects, by the contact area detection unit 103, the contact area on the touch sensor 101 by the finger or the input operation tool (step S306). Then, the control unit 104 referring to the memory unit 105, the input apparatus sets a pressing load threshold A2-α corresponding to the detected contact area as the pressing load threshold (step S307) and the damage threshold B-α corresponding to the detected contact area as the damage threshold (step S308). As illustrated in FIG. 6, for example, the input apparatus sets a pressing load threshold A2-1 and the damage threshold B-1 when the large contact area S1 by the finger or the like is detected, and sets a pressing load threshold A2-2 and the damage threshold B-2 when the small contact area S2 by the ballpoint pen or the like is detected.

Then, the control unit 104 determines whether the pressing load detected at step S302 reaches the second pressing load threshold A2-α (step S309). When it is determined that the pressing load does not reach the pressing load threshold A2-α, the input apparatus monitors a change in the pressing load (step S311). When the contact is released, that is, when the pressing load becomes 0, the input apparatus determines that the input to the touch sensor 101 by the user is finished and ends the operation.

On the other hand, when it is determined at step S309 that the pressing load reaches the pressing load threshold A2-α, the notification unit 106 notifies the user that the second level input is received (step S310).

Next, the control unit 104 determines whether the pressing load detected at step S302 reaches the damage threshold B-α set at step S307 (step S312). When it is determined that the pressing load reaches the damage threshold B-α, the input apparatus warns the user, by the notification unit 106, in a manner different from the notification at steps S304 and S310, that an excessive load is applied (step S313). On the other hand, when it is determined that the pressing load does not reach the damage threshold B-α, the input apparatus monitors a change in the pressing load by the pressing load detection unit 102 (step S314). When the contact to the touch sensor 101 by the user is released, that is, when the pressure load becomes 0, the input apparatus determines that the input to the touch sensor 101 by the user is finished and ends the operation.

For three or more pressing levels, the input apparatus sets the threshold An (n represents the number of pressing levels) to be equal to or smaller than the threshold B and, after repeating operations at steps S309-S311 as many times as needed, performs operations at and after step S312.

According to the input apparatus of the third embodiment, as described above, since the pressing load thresholds change according to the contact area, a margin of the damaging range may be ensured even when the pointed tool is used, thereby the multilevel pressing is enabled and damaging may be prevented more assuredly.

Although a representative example is described in each of the above embodiments, it is to be understood that those who are skilled in the art may change or alter in a multiple manner within the spirit and the scope of the present invention. Accordingly, the present invention is not limited to the above embodiment but may be changed or modified without departing from the scope of Claims. For example, the input apparatus according to the first embodiment may set the pressing load threshold to increase in proportion to the contact area. Also, it is not necessary to generate the notification when the pressing load reaches the pressing load threshold.

Also, although the contact area detection unit 103 and the control unit 104 are separated as individual blocks in each of the above embodiments, the control unit 104 may perform the operation of the contact area detection unit 103.

Further, in the third embodiment described above, the pressing load threshold is set based on the contact area on the touch sensor 101 by the finger or the input operation tool, and however, setting of the pressing load threshold is not limited to such a manner. For example, the value of the damage threshold, which is set according to the contact area, may be set as follows. The pressing load threshold A1 may be set at a value obtained by dividing the value of the damage threshold into halves (at a value of half of the damage threshold) when the input apparatus handles the one-level pressing. Also, when the input apparatus handles the two-level pressing, the pressing load threshold A1 may be set at a smaller value obtained by dividing the damage threshold into three (at a value of one third of the damage threshold), and the pressing load threshold A2 may be set at a larger value obtained by dividing the damage threshold into three (at a value of two thirds of the damage threshold). That is, a plurality of thresholds (the damage threshold and the pressing load thresholds A1, A2, A3 . . . ) may be set at regular intervals. Thereby, when the contact area is small, the damage threshold becomes low and the pressing load threshold A1 is also set to be lower in comparison to that when the contact area is large. Accordingly, setting to notify the user when the pressing load reaches the pressing load threshold A1 enables the user, when receiving the notification based on the pressing load threshold A1, to estimate a pressing load that reaches the damage threshold and the damaging range. Such a configuration may more effectively prevent from damaging the touch sensor.

REFERENCE SIGNS LIST 101 touch sensor
102 pressing load detection unit
103 contact area detection unit
104 control unit
105 memory unit
106 notification unit

The invention claimed is:

1. An input apparatus having a touch sensor, said input apparatus comprising;
   a pressing load detection unit configured to detect a pressing load applied by a pressing object pressing the touch sensor;
   a contact area detection unit configured to detect a contact area of the pressing object on the touch sensor;
   a memory unit configured to store a pressing load threshold for receiving an input and a damage threshold higher than the pressing load threshold and the damage threshold being varied according to the contact area;
   a control unit configured to obtain the pressing load threshold and the damage threshold corresponding to the contact area detected by the contact area detection unit from the memory unit, and to receive the input when the pressing load detected by the contact area detection unit reaches the pressing load threshold and to generate a warning signal when the pressing load detected by the contact area detection unit reaches the damage threshold; and
   a notification unit configured to receive the warning signal from the control unit and to output a warning.

2. The input apparatus according to claim 1, wherein the memory unit stores pressing load thresholds of a plurality of levels, and
   the control unit obtains the pressing load thresholds of the plurality of levels from the memory unit and, when the pressing load detected by the contact area detection unit reaches the pressing load threshold of each of the levels, receives an input of each of the levels.

3. The input apparatus according to claim 2, wherein at least a pressing load threshold of a level where the pressing load is maximum among the pressing load thresholds of the plurality of levels is set to increase in proportion to the contact area.

4. The input apparatus according to claim 1, wherein the pressing load threshold is set to increase in proportion to the contact area.

5. The input apparatus according to claim 1, wherein the control unit includes a unit to obtain the pressing load threshold from the memory unit and, when the pressing load detected by the contact area detection unit reaches the pressing load threshold, to generate an input reception notification signal, and
   the notification unit receives the input reception notification signal from the control unit and notifies that the input is received.

* * * * *